United States Patent [19]
Smith

[11] Patent Number: 6,042,052
[45] Date of Patent: Mar. 28, 2000

[54] RETRACTABLE STEP FAIRING FOR AMPHIBIAN AIRPLANE

[76] Inventor: Donald E. Smith, 1832 Bayonne St., Sarasota, Fla. 34231

[21] Appl. No.: 09/160,140

[22] Filed: Sep. 25, 1998

[51] Int. Cl.[7] .................................................. B64C 35/00
[52] U.S. Cl. .......................... 244/105; 244/106; 244/101; 244/130
[58] Field of Search .................. 244/105, 106, 244/130, 101, 129.6

[56] References Cited

U.S. PATENT DOCUMENTS

| | | | |
|---|---|---|---|
| 1,420,609 | 6/1922 | Curtiss | 244/105 |
| 1,683,805 | 9/1928 | Reichelt | 244/105 |
| 1,728,621 | 9/1929 | Martin | 244/105 |
| 1,794,474 | 3/1931 | Miller | 244/105 |
| 2,214,945 | 9/1940 | Weihmiller | 244/105 |
| 2,228,860 | 1/1941 | Schlippe | 244/105 |
| 2,320,574 | 6/1943 | Dornier | 244/105 |
| 2,347,841 | 5/1944 | Parker | 244/105 |
| 2,354,569 | 7/1944 | Beard | 244/105 |
| 2,601,836 | 7/1952 | Crewe | 244/106 |
| 2,958,486 | 11/1960 | Bloomfiled et al. | 244/105 |
| 3,190,587 | 6/1965 | Fries | 244/106 |
| 5,645,250 | 7/1997 | Gevers | 244/105 |
| 5,692,706 | 12/1997 | Arney et al. | 244/129.6 |

*Primary Examiner*—J. Woodrow Eldred
*Attorney, Agent, or Firm*—Robert P. Bell; Kile McIntyre Harbin & Lee

[57] ABSTRACT

The invention comprises an improved seaplane having a retractable step. The term retractable step, however, is a misnomer. The step portion of the seaplane float includes a panel which may be extended once the plane is airborne to reduce aerodynamic drag created by such hydrodynamic steps. The panel may be hinged at a rear portion of the aircraft and extended and retracted using a hydraulic strut or the like. Side panels may also be provided which would hinge via a piano type hinge or the like to the sides of the extendable panel. The side panels may be provided with an end pin or pins which would travel in a track within the step cavity such that the side panels would be pushed into position as the step cover panel is extended. The apparatus of the present invention may be employed in both conventional and tunnel type hulls.

12 Claims, 8 Drawing Sheets

RETRACTABLE STEP FAIRING FOR AMPHIBIAN AIRPLANE

FIELD OF THE INVENTION

The present invention relates to water hulls or floats for aircraft, surface effect vehicles, hydrofoils, the like. In particular, the present invention is directed toward improvements in the water "step" used in such designs.

BACKGROUND OF THE INVENTION

The use of a hydrodynamic step in a water hull for aircraft use is attributed by some to Glenn Curtiss. Early floatplanes designed by Curtiss had difficulty in becoming airborne, regardless of the amount of power applied or wing surface provided. It was discovered that the float or hull of the craft would tend to "stick" to the water surface due to the laminar flow of the water.

The simple solution was to introduce a drag-inducing (and vortex generating) step at the rearward portion of hull or float to reduce or eliminate water adhesion and allow the craft to separate from the water flow. Unfortunately, this same step design also generates air vortices once the craft is airborne, thus contributing to aerodynamic drag.

Early aircraft utilized construction techniques resulting in high drag coefficients. Struts, wires, and braces in the airstream resulting in high drag designs. Thus, the amount of drag introduced by a hydrodynamic step contributed relatively little to the overall drag of the craft. However, modern aircraft are much more carefully designed to eliminate drag and have highly efficient aerodynamic designs. In such a design, a float or hull step may comprise a significant source of drag.

Curtiss U.S. Pat. No. 1,420,609, issued Jun. 20, 1922, discloses an early amphibious airplane. This reference is one of a number of Curtiss patents which represent the earliest float planes in the art. Given the high drag losses of these early planes, the concept of retractable step (or indeed the concept of a step at all) was not known. However, the idea of retractable wingtip floats appears to have been disclosed in at least one Curtiss patent.

Martin U.S. Pat. No. 1,728,621, issued Sep. 17, 1929, discloses a seaplane with retractable float. In the Martin design, the entire float retracts into the fuselage of the airplane to improve aerodynamics. However, the step portion of the airplane still remains in the airstream.

Von Miller U.S. Pat. No. 1,794,474, issued Mar. 3, 1931, discloses a pontoon with retractable doors. Von Miller takes an unusual approach to reducing drag with pontoons by providing front and rear doors on the pontoon. In flight, the doors are opened allowing air to pass through the center portion of the pontoon. In addition to sealing problems, such a design might not significantly reduce drag, but actually increase it. The pontoons, with doors open, act as a flow orifice, which in and of itself creates drag.

Weihmiller U.S. Pat. No. 2,214,945, issued Sep. 17, 1940, discloses a retractable hydrovane. The hydrovane appears to be of the hydrofoil variety in that it allows the boat to plane on the V-shaped hydrofoil. Note, however, how his hydroplane retracts into the step portion (FIG. 4) forming an aerodynamic fairing.

Von Schlippe U.S. Pat. No. 2,228,860, issued Jan. 14, 1941, discloses an apparatus allowing plane to land in the water under emergency conditions. Von Schlippe provides an aerodynamic flotation device which may be used by an airplane for emergency landings. To make the float more aerodynamic, Von Schlippe puts a fairing over the step portion. The fairing is made of a water soluble material so that upon landing, the fairing will dissolve in water exposing the step. This reference does disclose the idea of placing a fairing over a step to enhance streamlining. However, the Von Schlippe device only has a single use application.

Stampfl U.S. Pat. No. 2,265,206, issued Dec. 9, 1941, discloses a hydroplane boat hull. This reference is relevant to the extent that it discloses an extendable planing board which may extend into the water stream. An inflatable bladder is used to extend the planing board and spring action is used to retract the planing board. This reference is relevant to the extent that it discloses the use of movable surfaces in a hydroplane boat hull. However, in Stampfl, the planes extend into the waterstream. Moreover, Stampfl appears to be directed toward a boat and not an airplane, and thus the motivation to apply aerodynamic techniques to Stampfl do not exist.

Dornier U.S. Pat. No. 2,320,574, issued Jun. 1, 1943, discloses a retractable float system for a seaplane. FIG. 5 is of particular interest. The entire boat shaped section of the hull is covered over with a retractable float which may be retracted to form a smooth fuselage. When landing, the floats are extended, exposing the boat shaped fuselage and adding additional flotation to the side of the aircraft.

Parker U.S. Pat. No. 2,347,841, issued May 2, 1944, discloses a seaplane having extendable step portions. In flight, the portions are retracted to form a smooth surface. For take off and landings, primary and secondary steps 9, 10, and 11 are extended using a hydraulic system. However, this system actually discloses an extendable step. Also note the large surface areas employed by Parker and the very complicated hydraulic system used.

Bloomfield et al. U.S. Pat. No. 2,958,486, issued Nov. 1, 1960, discloses a retractable planing device for a float plane. This device is not a step per se. This device extends to form a planing board and retracts in flight.

Arney et al. U.S. Pat. No. 5,692,706, issued Dec. 2, 1997, discloses an inflatable float step reinforcement system. Arney is directed toward inflatable floats, such as the FULL LOTUS™ floats used in ultralights and small planes. An inflatable bladder is provided at the step portion of the float. Pressure within the bladder may be regulated to alter the shape and size of the step.

Although a number of prior art references appear to start to address the idea of reducing drag formed from an aerodynamic step, none of the devices appear to have been successful in the marketplace, most likely due to the increased weight and cost of such devices. What remains a requirement in the art is a hydrodynamic step which can be faired once in flight so as to reduce aerodynamic drag without the need for a complex, heavy, and expensive mechanism.

SUMMARY OF THE INVENTION

The invention comprises an improved seaplane having a retractable step fairing. The step portion of the seaplane float includes a panel which may be extended once the plane is airborne to reduce aerodynamic drag created by such hydrodynamic steps.

The panel may be hinged at a rear portion of the aircraft and extended and retracted using a hydraulic strut or the like. Side panels may also be provided which hinge via a piano type hinge or the like to the sides of the extendable panel. The side panels may be provided with an end pin or pins which would travel in a track within the step cavity such that the side panels would be pushed into position as the step cover panel is extended.

The apparatus of the present invention may be employed in both conventional and tunnel type hulls and may be used for seaplane, amphibious aircraft, aircraft floats, hydrofoils, surface effect craft, or boats.

DETAILED DESCRIPTION OF THE INVENTION

Figure 1:
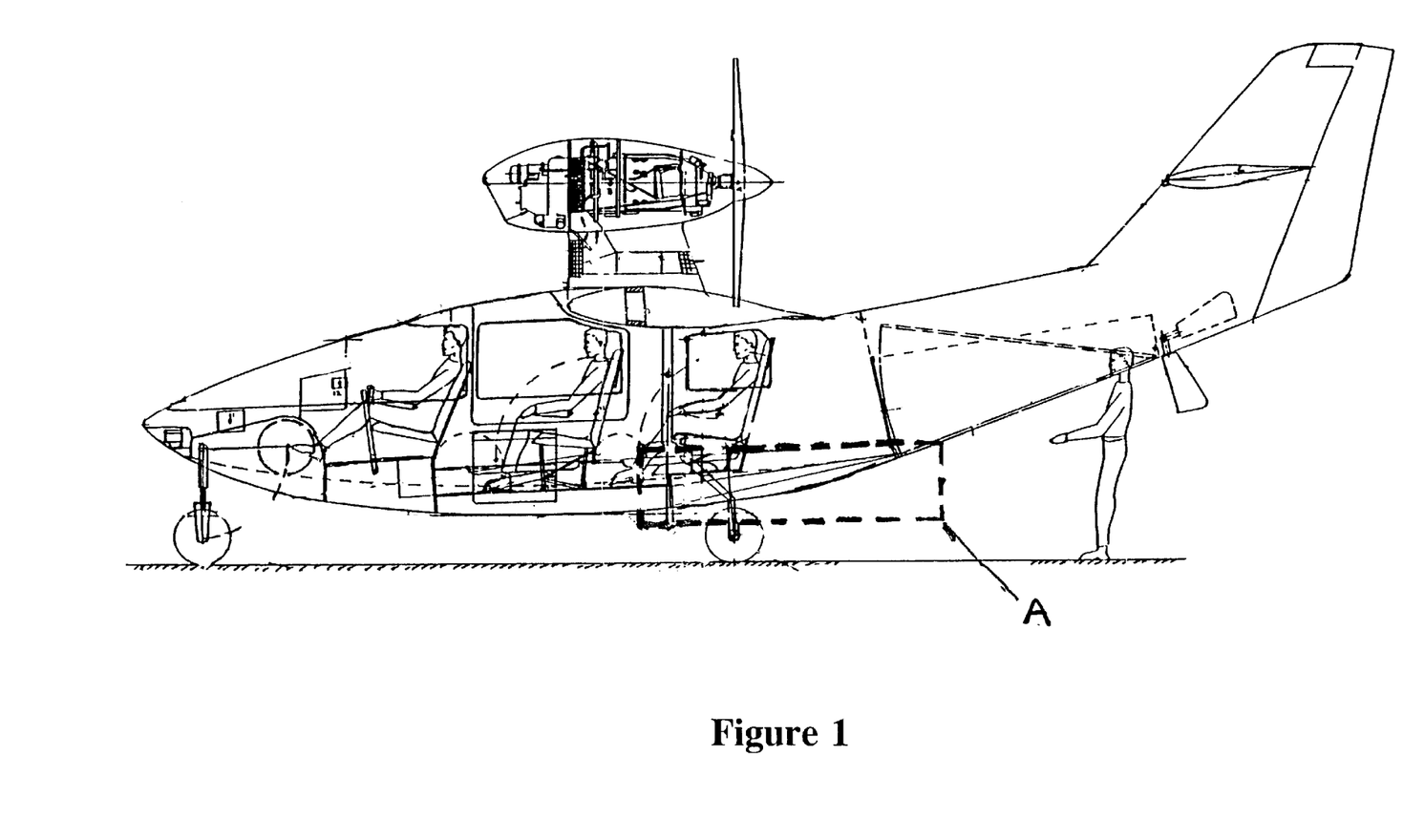
FIG. 1 is a side view of an amphibious aircraft incorporating the step fairing of the present invention.

FIG. 1 is a side view of an amphibious aircraft incorporating the step fairing of the present invention. The step fairing of the present invention may be applied to a number of different amphibious or seaplane designs, as well as to seaplane floats. However, the aircraft of FIG. 1 illustrates the preferred embodiment of the present invention.

The aircraft of FIG. 1 is designed to provide high lift capability for passengers and/or cargo by combining efficient aerodynamic design with a large powerplant. Part of this efficient aerodynamic design includes the retractable step fairing of the present invention. The retractable step fairing is illustrated within box "A" of FIG. 1. FIG. 1 illustrates where the retractable step fairing may be located on an aircraft.

Figure 2:
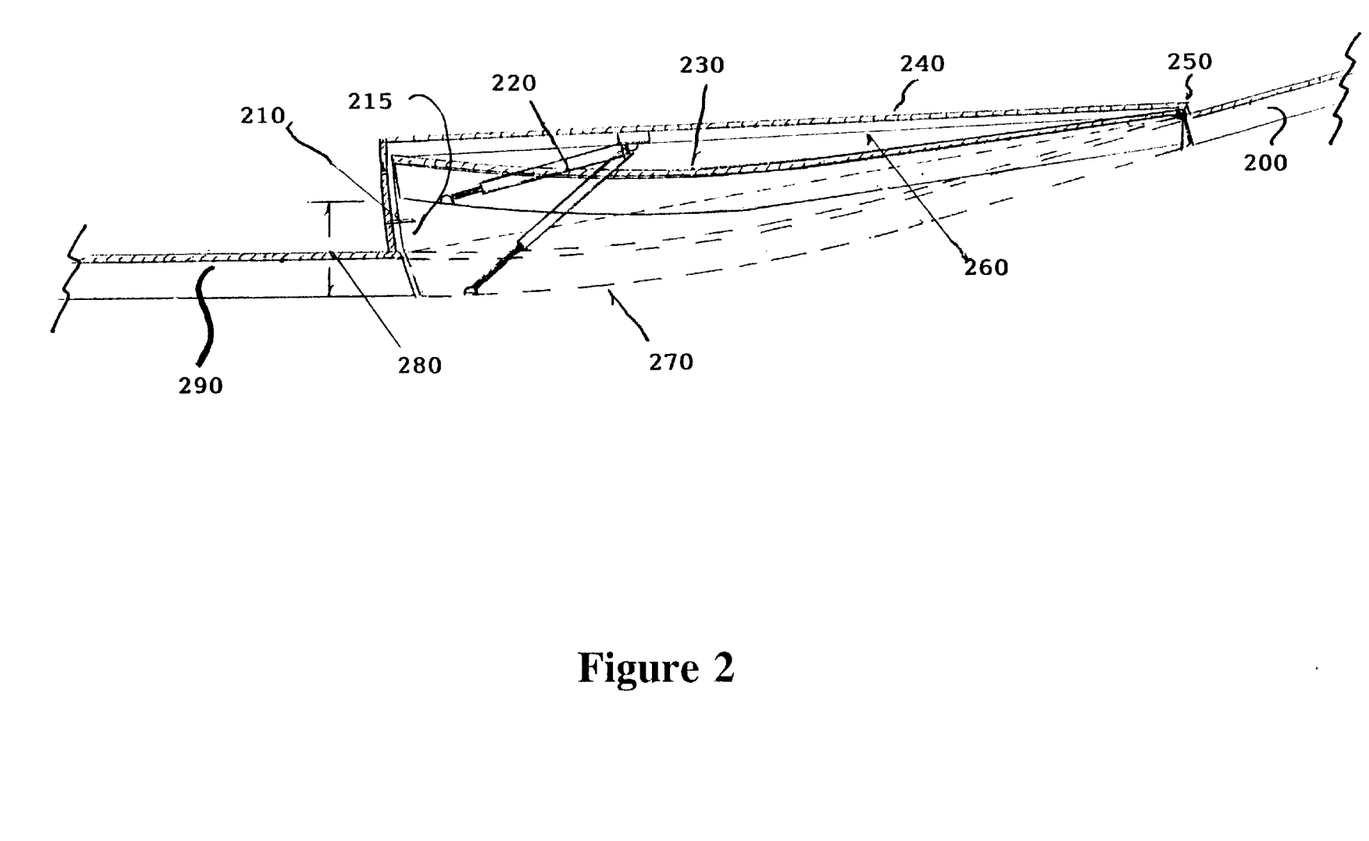
FIG. 2 is an enlarged view of the step fairing outlined by box "A" in FIG. 1.

FIG. 2 is an enlarged view of the step fairing outlined by box "A" in FIG. 1. Hull 200 may have a V-shaped bottom as defined by hull line 270 (representing the keel line) and chine line 290. Step fairing 230 may retract into a portion of hull 200, hinged from a rear portion by hinge 250. Hinge 250 may comprise a piano hinge or the like.

Figure 5:
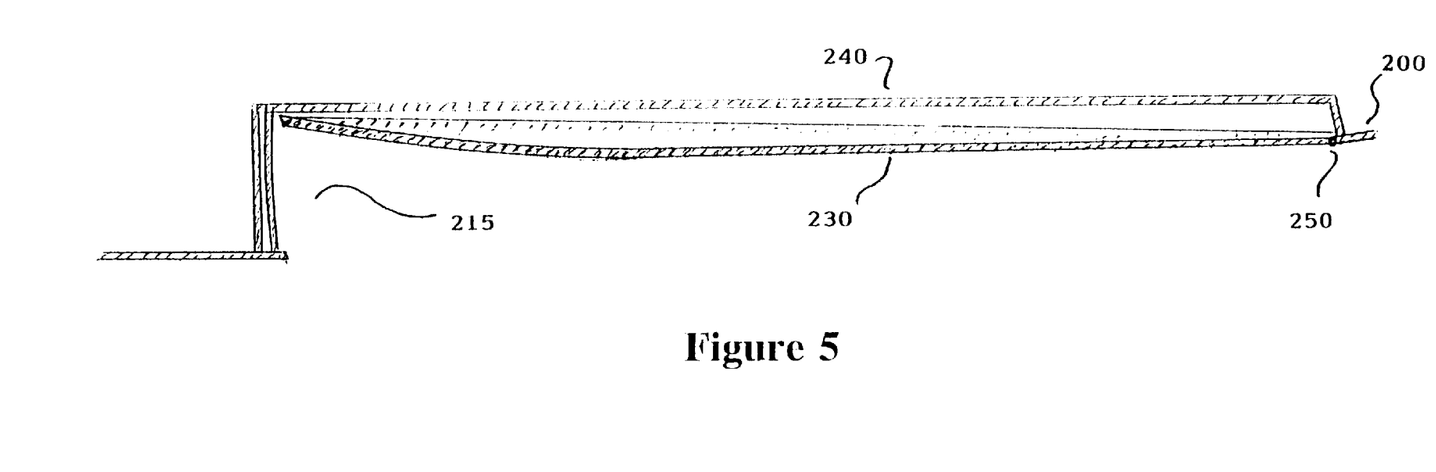
FIG. 5 is a cross-sectional side view of the step fairing of the present invention in a retracted position.
Figure 6:
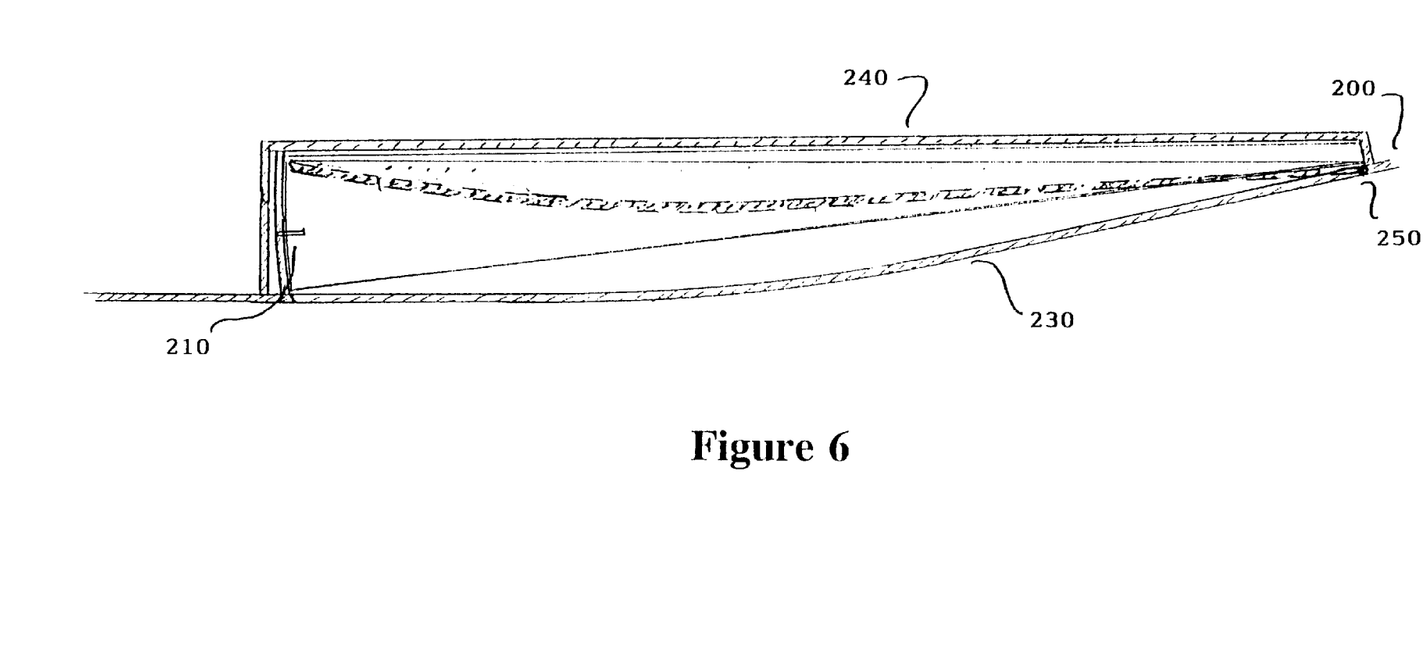
FIG. 6 is a cross-sectional side view of the step fairing of the present invention showing extended and retracted positions.

Hydraulic actuator 220 may be provided to raise and lower step fairing 230 from a retracted position, as illustrated in FIG. 5, to an extended position, as illustrated in FIG. 6. Hydraulic actuator 220 is illustrated as a hydraulic actuator in the preferred embodiment. However, as one of ordinary skill in the art may appreciate, other types of actuators may be used without departing from the spirit and scope of the present invention.

For example, hydraulic actuator 220 may be substituted by a pneumatic actuator, screw jack actuator, linear actuator or the like. In addition, cable controls, mechanical linkages, or other types of manually operated (e.g., hand cranked or operated) controls may be used without departing from the spirit and scope of the present invention.

Fairing 230 may retract into a portion of hull 200 defined by load floor 240. When fairing 230 is retracted, a step portion 215 having a depth 280 is formed. Step portion 215 acts as a hydrodynamic step, generating vortices and allowing the craft to lift off the water. Once in flight, fairing 230 may be lowered into position to reduce aerodynamic turbulence. Unlike some prior art designs, the fairing of the present invention extends once in flight, not while in the water. Thus, fairing 230 need not be sealed watertight, as it does not form a flotation part of hull 200. Moreover, since fairing 230 is retracted while in the water, heavy and expensive actuators and support structure are not required to counteract water pressure, as in some prior art extendable step designs.

Figure 3:
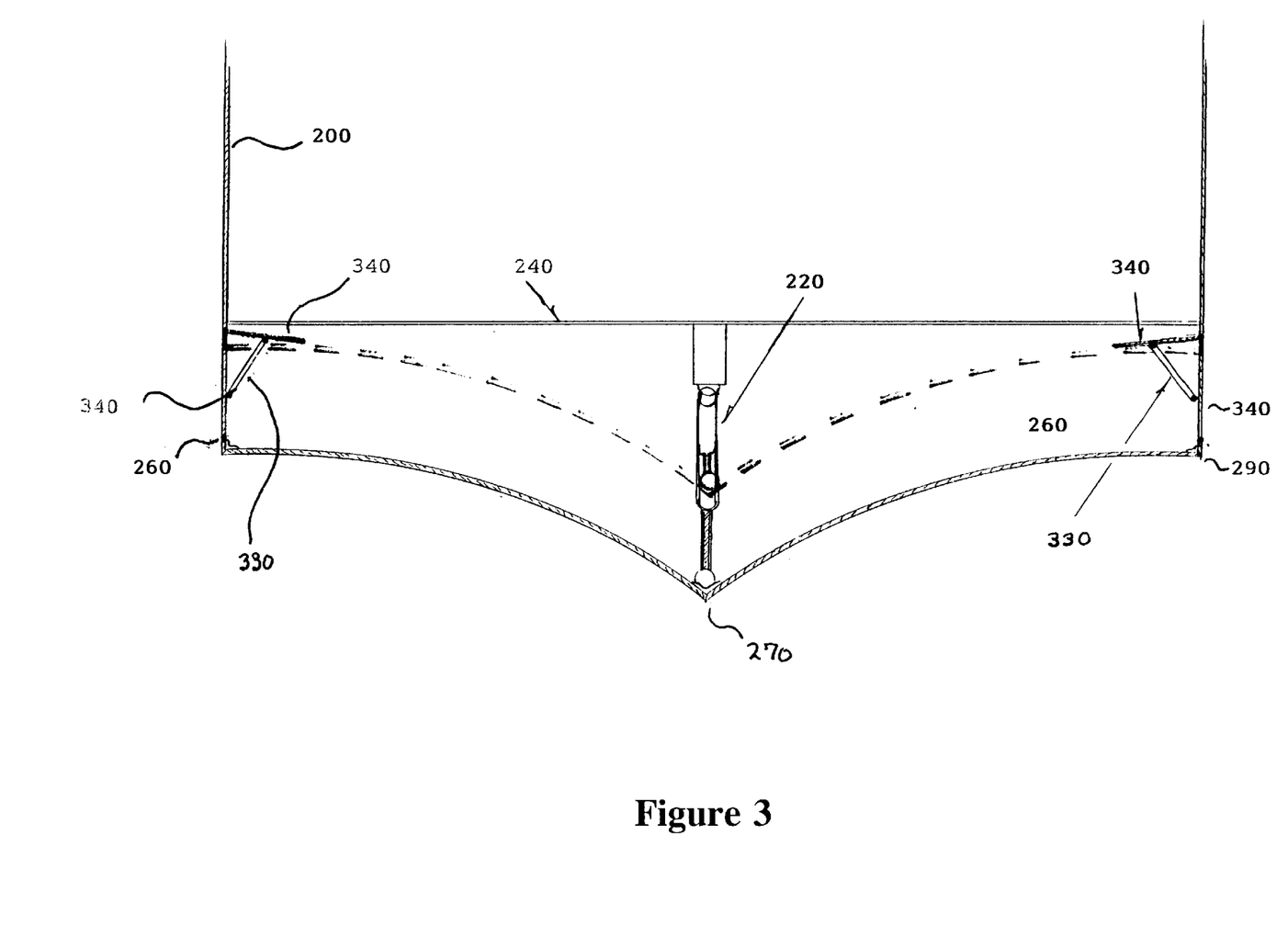
FIG. 3 is a cross-sectional end view of the step fairing of the present invention.

Side portions 340 of fairing 230 are also formed and are hinged via piano hinge 260 to respective sides of fairing 230, or to respective sides of hull 200. FIG. 3 is a cross-sectional end view of the step fairing of the present invention illustrating the operation of side portions 340.

Side portions 340 may be hinged to fairing 230 or to hull 200. Whether side portions 340 are hinged to fairing 230 or hull 200 is a matter of design choice. For a curved fairing, it may be more expedient to hinge side portions to a straight line portion of hull 200. Alternatively, as illustrated in FIG. 2, a portion of side portion 340 may be hinged via hinge 260 so as to provide a straight line for hinging purposes.

In either embodiment, side portions 340 may each be provided with a pin 210 which may engage a respective slot 330. As fairing 230 is retracted, side portions 340 fold inward along hinges 260, guided by pins 210 through respective slots 330. Thus, side portions 340 fold relatively flat, allowing fairing 230 to retract a sufficient amount to form step 215. Once in flight, side portions 340 extend along with fairing 230, pivoting along hinge 260 as guided by pins 210 through respective slots 330. When fully extended, fairing 230 and side portions 340 present a smooth, uninterrupted surface to the airstream.

Figure 4:
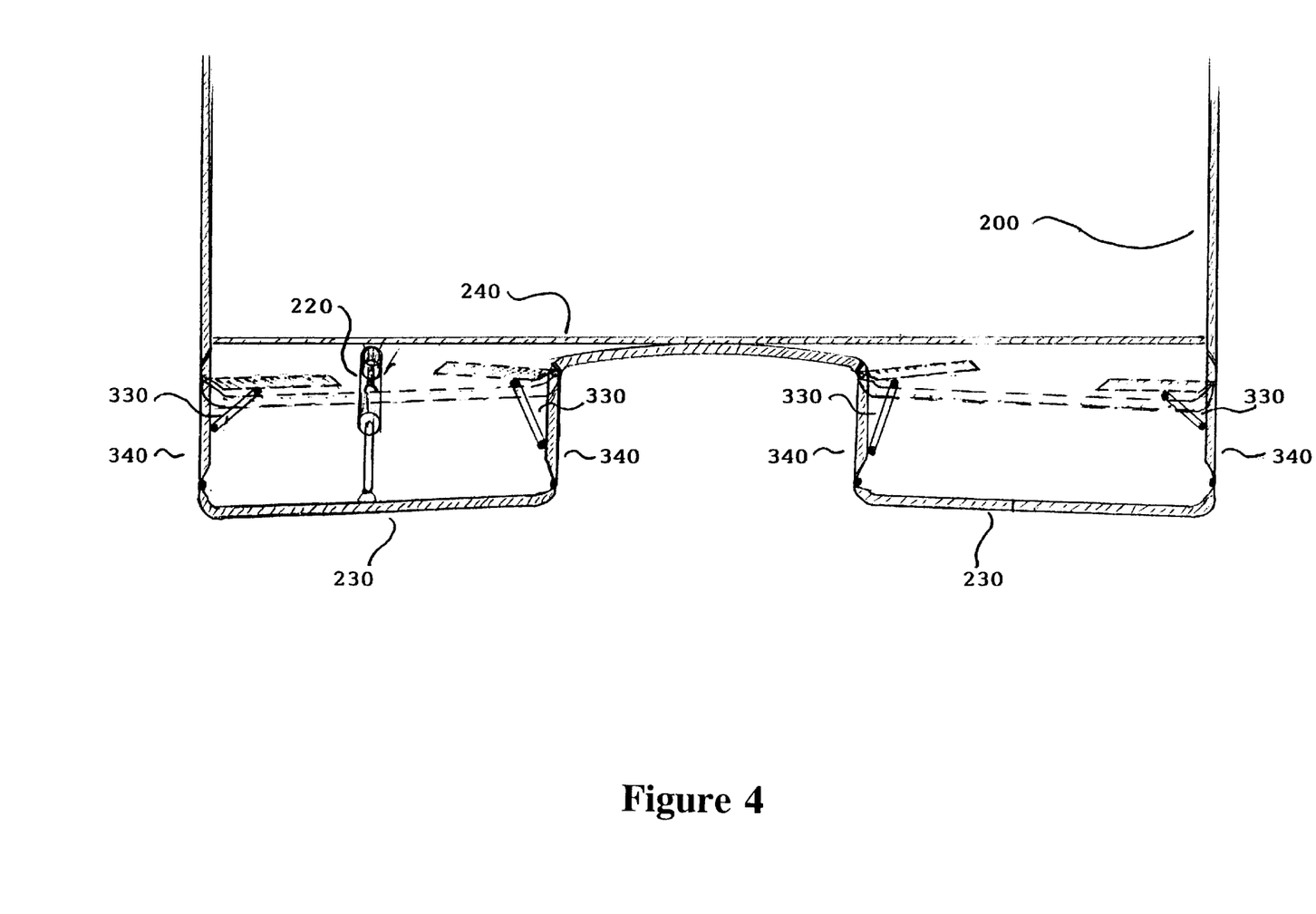
FIG. 4 is a cross-sectional end view of an alternative embodiment of the step fairing of the present invention for use with a tunnel hull.

FIG. 4 is a cross-sectional end view of an alternative embodiment of the step fairing of the present invention for use with a tunnel hull. For the sake of illustration, the same reference numerals have been utilized in FIG. 4 as in FIGS. 2 and 3.

In the embodiment of FIG. 4, hull 200 may have a tunnel shaped bottom as illustrated in the Figure. Such tunnel shaped hulls are well known in the art and may provide improved water lift and water handling characteristics. Step fairings 230 may retract into respective portions of portion of hull 200, hinged from a rear portion by hinge 250 (not shown). Hinge 250 may comprise a piano hinge or the like.

Hydraulic actuators 220 may be provided to raise and lower step fairings 230 from a retracted position, as illustrated by the dashed lines in FIG. 4, to an extended position, as illustrated by the solid lines of fairing 230. For the sake of illustration, only one of actuators 220 are illustrated in FIG. 4. Of course, a single actuator may be utilized, within the spirit and scope of the present invention, by providing appropriate mechanical linkages between the two step fairings 230 of FIG. 4.

Fairings 230 may retract into respective portions of hull 200 defined by load floor 240. When fairings 230 are retracted, step portions are formed. As in the embodiment of FIGS. 2 and 3, the step portions act as a hydrodynamic steps, generating vortices and allowing the craft to lift off the water. Once in flight, fairings 230 may be lowered into position to reduce aerodynamic turbulence.

Side portions 340 of fairings 230 are also formed and are hinged via piano hinges 260 to respective sides of fairings 230, or to respective sides of hull 200 in a similar manner to the embodiment of FIGS. 2 and 3. Side portions 340 may each be provided with a pin 210 which may engage respective slots 330. As fairings 230 are retracted, side portions 340 fold inward along hinges 260, guided by pins 210 through slots 330. Thus, side portions 340 fold relatively flat, allowing fairings 230 to retract a sufficient amount to form a step.

While the preferred embodiment and various alternative embodiments of the invention have been disclosed and described in detail herein, it may be apparent to those skilled in the art that various changes in form and detail may be made therein without departing from the spirit and scope thereof.

For example, the side portions of the fairing may be hinged so as to fold outwardly, rather than inwardly. While such an arrangement might present additional aerodynamic drag while extended, the use of an outward folding side portions may allow the fairing to further retract. Moreover, as noted above, side portions may hinge from the fairing or from the hull, or a combination of hinging techniques may be utilized.

In addition, non-hinging side portions may be used. For example, side portions which are non-hinged may slide into corresponding slots in the hull when the fairing is retracted. Alternatively, side portions may be made non-retractable. Such side portions would extend into the water stream when the fairing is retracted and thus act as tunnel members.

Figure 8:
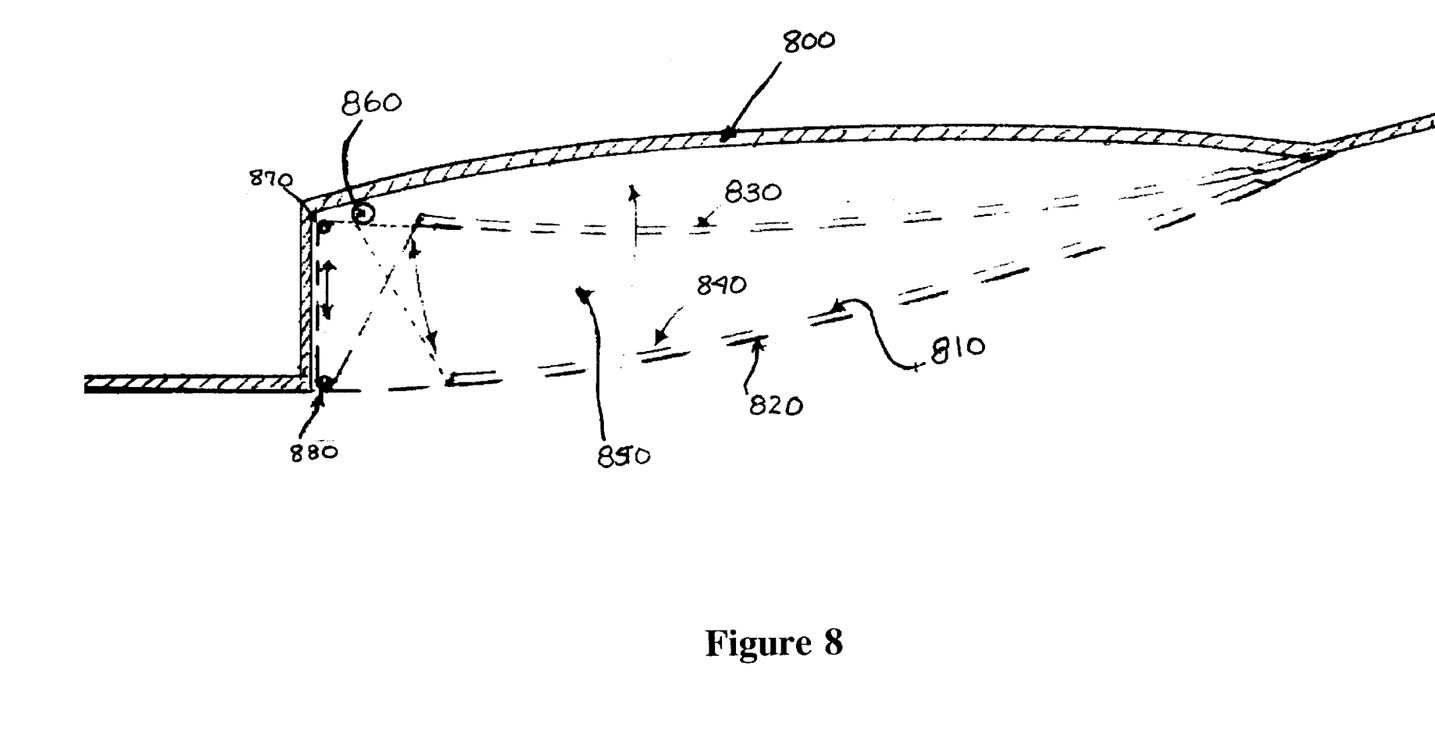
FIG. 8 is a cross-sectional side view of an alternative embodiment of the step fairing of the present invention using flexible side panels.

Other embodiments may also be contemplated. For example flexible fabric and/or plastic side portions may be used with a retractable fairing. When the fairing retracts, such flexible side portions would fold. When the fairing extends, the tension on the fairing from the actuator would serve to keep such side portions taut. FIG. 8 is a cross-sectional side view of an alternative embodiment of the step fairing of the present invention using flexible side panels.

In the embodiment of FIG. 8, a flexible sided step fairing may be applied either as a built-in design or may be applied as an aftermarket device to an existing seaplane of float hull 800. The step fairing of FIG. 8 may be defined by shape defining floating ribs 810 which stiffen and support flexible membrane 820. Flexible membrane 820 may comprise rubberized fabric or the like.

In retracted position 830, ribs 810 may be pulled upward to expose step area 850. In extended position 840, ribs 810 may stretch flexible membrane 820 into an aerodynamic fairing. Retract/extend spool cable 860 may be coupled to one or more of ribs 810 via rollers 870 and 880. The flexible membrane embodiment of FIG. 8 may be employed in a number of different embodiments. For example, a solid bottom portion of the step fairing may be provided with flexible side portions, or the entire fairing may be made of flexible or semi-rigid materials.

Figure 7:
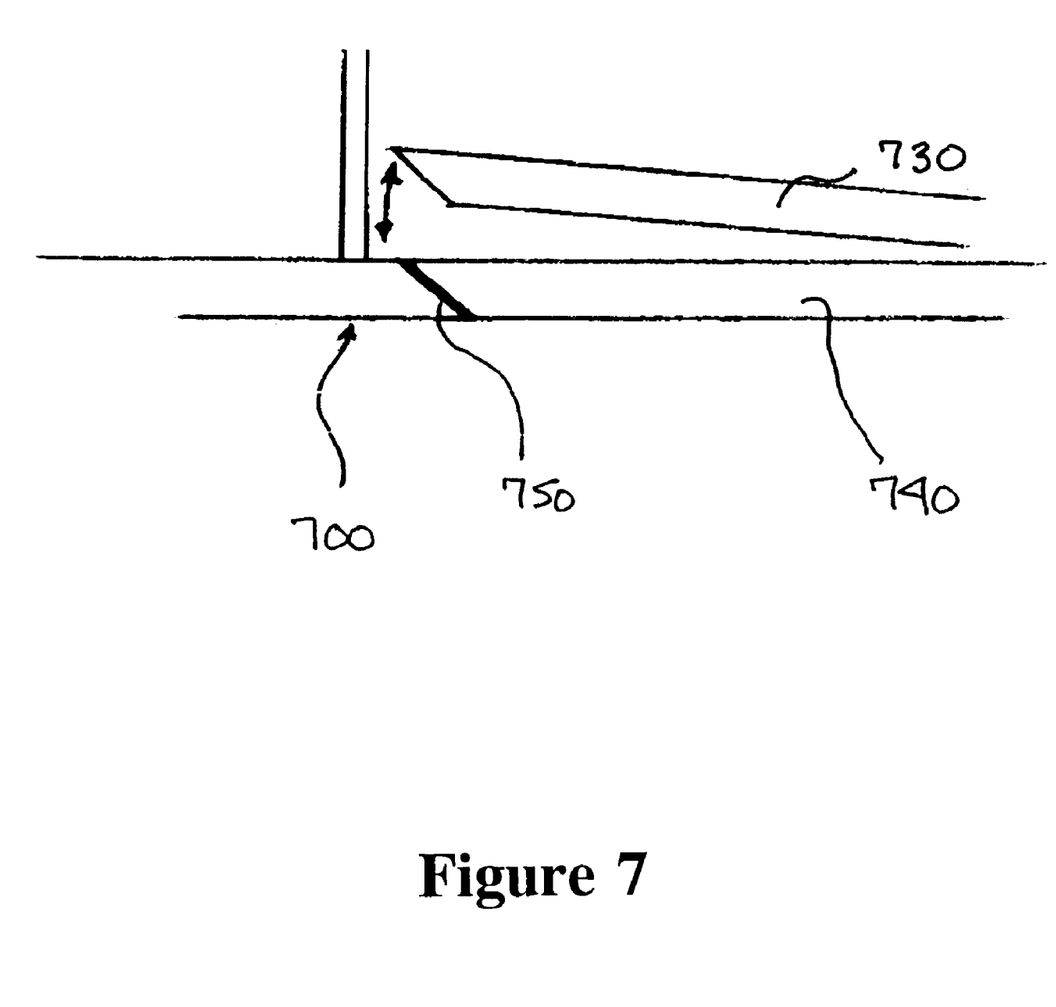
FIG. 7 is a cross-sectional enlarged view of an alternative embodiment of a stop mechanism for the step fairing of the present invention.

FIG. 7 is a cross-sectional enlarged view of an alternative embodiment of a stop mechanism for the step fairing of the present invention. As illustrated in FIG. 7, hull portion 700 may be provided with a diagonally cut kerf portion 750 which may engage with step fairing portion 740 when moved from retracted position 730. In an extended position, the step portion 740 may engage with hull portion 700 via kerf 750 to provide a smooth surface to airflow. In addition, kerf 750 provides a support for fairing portion 740 in an extended position.

Since the present invention provide a retractable fairing (as opposed to the retractable steps of the prior art), such embodiments are possible. Unlike retractable steps, the retractable faring of the present invention is not under substantial water pressure, and thus light and simple construction is possible. Moreover, unlike some of the retractable fairings of the prior art (which cover an entire hull), the step fairing of the present invention covers only the step portion, thus reducing complexity, weight and cost. Moreover, such a fairing, located in the step portion, is not subject to substantial aerodynamic stresses, and thus lightweight and simple construction is possible.

I claim:

1. An aircraft comprising:

at least one floating hull have a major axis along a longitudinal axis of the aircraft;

a hydrodynamic step, formed at an aft portion of the at least one floating hull, said hydrodynamic step generating vortices so as to allow the at least one hull to cleanly separate from water flow when said aircraft becomes airborne; and a retractable fairing, coupled to the at least one floating hull, said retractable fairing retractable into the hydrodynamic step when the aircraft is waterborne and extendable to cover the hydrodynamic step when the aircraft is airborne so as to reduce aerodynamic drag, wherein said retractable fairing further comprises:

a lower fairing portion having a cross-sectional shape conforming to a cross-sectional shape of the shape of the at least one hull at an edge of the hydrodynamic step, and wherein said retractable step further comprises:

a first hinge portion, having a first portion attached at a rearward portion of the lower fairing portion and a second portion attached at a rear portion of the hydrodynamic step, so as to allow said lower fairing portion to hinge upwardly into the hydrodynamic step.

2. The aircraft of claim 1, wherein said retractable step further comprises:

side portions, hinged to the lower fairing portion, said side portions folding against an inside portion of the lower fairing when said lower fairing is in a retracted position and extending flush with a side portion of the at least one hull when the lower fairing is in an extended position.

3. The aircraft of claim 2, further comprising:

at least one pin, mounted to at least one of the side portions, and extending therefrom in a longitudinal direction; and at least one slot, attached to the at least one hull in the step, said slot engaging said at least one pin so as to guide a corresponding side portion into a folded position when said lower portion of said retractable step fairing is raised.

4. The aircraft of claim 1, wherein said retractable step further comprises:

side portions, hinged to the at least one hull, said side portions folding against the hull when said lower fairing is in a retracted position and extending flush with a side portion of the at least one hull when the lower fairing is in an extended position.

5. The aircraft of claim 4, further comprising:

at least one pin, mounted to at least one of the side portions, and extending therefrom in a longitudinal direction; and at least one slot, attached to the at least one hull in the step, said slot engaging said at least one pin so as to guide a corresponding side portion into a folded position when said lower portion of said retractable step fairing is raised.

6. An retractable step fairing for an aircraft having at least one floating hull have a major axis along a longitudinal axis of the aircraft and a hydrodynamic step, formed at an aft portion of the at least one floating hull, the hydrodynamic step generating vortices so as to allow the at least one hull to cleanly separate from water flow when said aircraft becomes airborne, said retracting fairing comprising:

a lower fairing portion, coupled to the at least one floating hull, said lower fairing portion retractable into the hydrodynamic step when the aircraft is waterborne and extendable to cover the hydrodynamic step when the aircraft is airborne so as to reduce aerodynamic drag; and a first hinge portion, having a first portion attached at a rearward portion of the lower fairing portion and a second portion attached at a rear portion of the hydrodynamic step, so as to allow said lower fairing portion to hinge upwardly into the hydrodynamic step, wherein said lower fairing portion has a cross-sectional shape conforming to a cross-sectional shape of the shape of the at least one hull at an edge of the hydrodynamic step.

7. The retractable step fairing of claim 6, further comprising:

side portions, hinged to the lower fairing portion, said side portions folding against an inside portion of the lower fairing when said lower fairing is in a retracted position and extending flush with a side portion of the at least one hull when the lower fairing is in an extended position.

8. The retractable step fairing of claim 7, further comprising:

at least one pin, mounted to at least one of the side portions, and extending therefrom in a longitudinal direction; and at least one slot, attached to the at least one hull in the step, said slot engaging said at least one pin so as to guide a corresponding side portion into a folded position when said lower portion of said retractable step fairing is raised.

9. The retractable step fairing of claim 6, further comprising:

side portions, hinged to the at least one hull, said side portions folding against the hull when said lower fairing is in a retracted position and extending flush with a side portion of the at least one hull when the lower fairing is in an extended position.

10. The retractable step fairing of claim 9, further comprising:

at least one pin, mounted to at least one of the side portions, and extending therefrom in a longitudinal direction; and at least one slot, attached to the at least one hull in the step, said slot engaging said at least one pin so as to guide a corresponding side portion into a folded position when said lower portion of said retractable step fairing is raised.

11. The retractable step fairing of claim 6, wherein said lower fairing portion includes a flexible membrane portion for covering at least a portion of the hydrodynamic step when said lower fairing is extended.

12. The retractable step fairing of claim 11, wherein said lower fairing further includes rib portions, coupled to said flexible membrane portion into an aerodynamic fairing when said lower fairing is in an extended position.

* * * * *